United States Patent Office 3,824,304
Patented July 16, 1974

3,824,304
HAIR CONDITIONER
Antonio F. Villanueva, 69 Naguilian Road,
Baguio City, Philippines
No Drawing. Filed June 5, 1972, Ser. No. 259,454
Int. Cl. A61k 7/06
U.S. Cl. 424—74                                   1 Claim

ABSTRACT OF THE DISCLOSURE

A hair conditioner comprising of coconut oil, oil of capsicum, Citrus aurantium juice and a non-metallic halogen combined to provide a liquid that cleans the hair and gives a feeling of comfort and freshness to the scalp.

BACKGROUND OF THE INVENTION

The invention relates to a hair conditioner which cleans the scalp and hair, relieves itchiness of the scalp and removes dandruff through the cleansing action incident to use of the conditioner. The conditioner is intended to provide a feeling of comfort and make the scalp feel fresh and stimulated.

DESCRIPTION OF THE PREFERRED EMBODIMENT

The hair conditioner resulting from the invention is an almost white, pleasant smelling liquid that relieves general scalp itchiness, cleans the scalp, removes falling dandruff and leaves the scalp feeling fresh and comfortable.

The ingredients in the conditioner are, except for a non-metallic halogen, organic substances that are easily available from natural plants, some of which have been used as natural hair oil and as conditioners by the natives of the Far East for centuries.

The main ingredient is the oil from the coconut palm or Cocos nucifera. This is a common tree of the Far East and other tropical regions. The oil therefrom is used primarily in making soap and candles, however, it is also used by the natives as a hair oil. The oil is also used for cooking, as a lamp fuel and as a remedy for various ailments from headaches to skin infections by the natives.

Another ingredient of the conditioner is the juice from the fruit of the Citrus aurantium. This is another tree widely growth throughout the tropical and sub-tropical areas of the world. Although it is more popularly used as a flavoring for soft drinks, the natives of the Far East believe that it has medicinal properties that cure colds and give one a smooth and beautiful skin. Citrus aurantium is defined in the Hackh's Chemical Dictionary, 4th Edition; 1969 at page 162 as follows, "A genus of trees producing juice, rinds, oils and acids; e.g. sweet orange."

A further ingredient is the juice from the fruit of the Capsicum. This is a shrub or climbing plant that produces pungent fruits which are used as condiments or as a carminative or stimulant. The fruit owes its pungency to a resin therein and its flavor to a volatile oil. It also contains an alkaloid whose empirical formula is that of morphine. The plant is widely cultivated in India, Thailand, the East Indies and the Islands of the South Seas. The natives of the Far East use the juice as a medicine for the treatment of catarrh, an inflammation of the mucous membranes of the human nose and air passages.

The last ingredient of the conditioner is non-metallic halogen in the form of tincture of iodine. It contains in each 100 ml., not less than 1.8 gm. and not more than 2.2 gm. of iodine (I) and not less than 2.1 gm. and not more than 2.6 gm. of sodium iodide (NaI). It is prepared by dissolving 20 gm. of iodine and 24 gm. of sodium iodide in 500 ml. of alcohol and then adding sufficient purified water to make the product measure 1000 ml. This ingredient has many uses in medicine, as, the synthesis of organic chemicals, the manufacture of dyes, in analytical chemistry and in the human diet to maintain proper metabolism. It is also used as a topical fungicide and bactericide to prepare a body for surgery.

The conditioner is prepared quite simply. Oil and juice from the natural plants are either readily available or are easily extracted from the fruits of the plants. They are combined in the following proportions:

| | |
|---|---|
| Coconut oil _____oz__ | 32 |
| Juice from the fruit of Citrus aurantium _____oz__ | 3½ |
| Capsicum _____oz__ | 2 |
| Tincutre of Iodine _____cc__ | 22 |

The ingredients are combined in the proper proportions and heated until they are amalgamate.

The resultant conditioner is applied as follows:
(1) using a hot towel, apply the conditioner to the scalp and hair, and
(2) with the head down, massage the scalp briskly (avoid damaging the scalp tissues). This should be done every other day. Also, one should not use any other hair dressing, medication or pomades.

It should be understood, of course, that the foregoing disclosure relates to only a preferred embodiment of the present invention and that it is intended to cover all changes and modifications of the example of the invention herein chosen for the purposes of the disclosure which do not constitute departures from the spirit and scope of the invention.

I claim:
1. A hair conditioner comprising:
approximately thirty-two ounces of coconut oil;
approximately three and one-half ounces of the liquid from the fruit of the Citrus aurantium;
approximately two ounces of capsicum juice; and
approximately twenty-two cc. of tincture of iodine.

References Cited

Goodman, Cosmetic Dermatology, (1936), pp. 121 and 234 through 239.

STANLEY J. FRIEDMAN, Primary Examiner

U.S. Cl. X.R.
424—70